United States Patent
Mizoguchi

(10) Patent No.: US 12,545,289 B2
(45) Date of Patent: Feb. 10, 2026

(54) VEHICLE TRAVEL CONTROL APPARATUS AND SERVER APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 134 days.

(21) Appl. No.: 18/597,436

(22) Filed: Mar. 6, 2024

(65) Prior Publication Data

US 2024/0308543 A1   Sep. 19, 2024

(30) Foreign Application Priority Data

Mar. 16, 2023  (JP) ................................. 2023-041739

(51) Int. Cl.
*B60W 60/00* (2020.01)
*B60W 30/165* (2020.01)

(52) U.S. Cl.
CPC ........ *B60W 60/001* (2020.02); *B60W 30/165* (2013.01); *B60W 2420/403* (2013.01); *B60W 2520/04* (2013.01); *B60W 2555/60* (2020.02)

(58) Field of Classification Search
CPC ............. B60W 60/001; B60W 30/165; B60W 2420/403; B60W 2520/04; B60W 2555/60; B60W 30/18154; B60W 30/18159; B60W 60/0025
See application file for complete search history.

(56) References Cited

U.S. PATENT DOCUMENTS

| | | | |
|---|---|---|---|
| 2015/0151742 A1* | 6/2015 | Clarke | G01C 21/30 701/28 |
| 2017/0341643 A1* | 11/2017 | Gutmann | B60W 30/18154 |
| 2017/0361841 A1* | 12/2017 | Kojo | B60W 30/165 |
| 2020/0285244 A1* | 9/2020 | Gier | G05D 1/0246 |
| 2023/0001918 A1* | 1/2023 | Koike | B60W 30/18154 |
| 2023/0154336 A1* | 5/2023 | Cho | B60W 30/165 701/24 |
| 2023/0237911 A1* | 7/2023 | Hoashi | G08G 1/0112 701/301 |

FOREIGN PATENT DOCUMENTS

| | | |
|---|---|---|
| JP | 2017-222317 A | 12/2017 |
| JP | 2021-043497 A | 3/2021 |

* cited by examiner

*Primary Examiner* — Khoi H Tran
*Assistant Examiner* — Tristan J Greiner
(74) *Attorney, Agent, or Firm* — Rimon P.C.

(57) ABSTRACT

A vehicle travel control apparatus to be applied to a vehicle includes a camera and an automated driving processor. The camera captures a vehicle's course image. The automated driving processor executes a travel control of the vehicle under an automated driving control including a preceding vehicle following control, based on the image. When the traffic light at the intersection is changed from a lighting state indicating that the vehicle is allowed to pass after the vehicle has stopped at the intersection, the automated driving processor: determines whether the vehicle is allowable to start moving under the automated driving control, based on a projection amount of a vehicle's current position from a stop position of the intersection; and forcibly executes the preceding vehicle following control to restart the vehicle to allow the vehicle to escape from the intersection, when the projection amount is greater than or equal to a threshold.

9 Claims, 7 Drawing Sheets

VEHICLE TRAVEL CONTROL APPARATUS AND SERVER APPARATUS

CROSS-REFERENCE TO RELATED APPLICATIONS

The present application claims priority from Japanese Patent Application No. 2023-041739 filed on Mar. 16, 2023, the entire contents of which are hereby incorporated by reference.

BACKGROUND

The disclosure relates to a vehicle travel control apparatus and a server apparatus.

Development of automated driving has progressed for vehicles such as automobiles. The automated driving is classified into levels 1 to 5. For example, the automated driving of level 1 assists a driving operation performed by a driver who drives a vehicle. The automated driving of level 5 is referred to as fully automated driving and allows the vehicle to travel without operation performed by the driver of the vehicle. Many manufacturers at a present stage develop commercial vehicles of level 2 and level 3.

A vehicle that is adapted to travel by such automated driving basically achieves the automated driving by combining multiple travel controls including, for example, a preceding vehicle following control, a lane keep control, and an interference avoidance control.

The lane keep control controls, for example, steering to keep the vehicle within a lane of a road in which the vehicle is traveling.

The preceding vehicle following control controls the vehicle to follow a preceding vehicle that is traveling in front of the vehicle while keeping an inter-vehicle distance corresponding to a vehicle speed between the vehicle and the preceding vehicle. When the vehicle comes close to the preceding vehicle, the preceding vehicle following control causes the vehicle to decelerate in accordance with a speed of the preceding vehicle. When the preceding vehicle stops, the preceding vehicle following control causes the vehicle to stop with at least a minimum inter-vehicle distance provided between the vehicle and the preceding vehicle. Note that, when there is no preceding vehicle close to the vehicle in the lane of the road in which the vehicle is traveling, the preceding vehicle following control controls the vehicle to travel at a set speed. The preceding vehicle following control as described above is sometimes incorporated in a vehicle as, for example, an adaptive cruise control (ACC).

The interference avoidance control helps to prevent interference of the vehicle with an obstacle if there is an obstacle or if it is predicted that there will be an obstacle on a course on which the vehicle is traveling. The obstacle includes, for example, a preceding vehicle, an oncoming vehicle, a pedestrian, a cyclist, and a curb. The interference avoidance control predicts interference between the vehicle and the obstacle on the course by, for example, analyzing an image captured by a camera mounted on the vehicle. When the interference with the obstacle is predicted, the interference avoidance control controls the vehicle to avoid or help prevent the interference.

Japanese Unexamined Patent Application Publications Nos. 2021-043497 and 2017-222317 disclose, as a technique related to automated driving, a special travel control for a vehicle to pass through an intersection having a traffic light. The special travel control has a configuration different from that of a basic automated driving control as described above. When such special travel control is to be used together with the above-described basic automated driving control, the special travel control and the basic automated driving control are to be switched with each other. This complicates the control of the entire travel control. This makes it difficult to achieve reliability in the control of the entire travel control.

SUMMARY

An aspect of the disclosure provides a vehicle travel control apparatus to be applied to a vehicle. The vehicle travel control apparatus includes a camera and an automated driving processor. The camera is configured to capture an image of a course of the vehicle. The automated driving processor is configured to execute a travel control of the vehicle that is adapted to travel on a road including an intersection having a traffic light under an automated driving control including a preceding vehicle following control, based on the image captured by the camera. The automated driving processor is configured to, when the traffic light at the intersection is changed from a lighting state indicating that the vehicle is allowed to pass along the course of the vehicle after the vehicle has stopped at the intersection including the traffic light: determine whether the vehicle is allowable to start moving under the automated driving control, based on a projection amount of a current position of the vehicle stopped at the intersection from a stop position of the intersection; and forcibly execute the preceding vehicle following control to restart the vehicle stopped at the intersection to allow the vehicle to escape from the intersection, when the projection amount is greater than or equal to a threshold.

An aspect of the disclosure provides a server apparatus including a server communicator and a server processor. The server communicator is configured to communicate with a vehicle that is adapted to travel on a road including an intersection having a traffic light under an automated driving control including a preceding vehicle following control. The server processor is configured to execute a travel control of the vehicle, based on an image taken by a camera that is mounted on the vehicle and is configured to capture the image of a course of the vehicle. The server processor is configured to, when the traffic light at the intersection is changed from a lighting state indicating that the vehicle is allowed to pass along the course of the vehicle after the vehicle has stopped at the intersection including the traffic light: determine whether the vehicle is allowable to start moving under the automated driving control, based on a projection amount of a current position of the vehicle stopped at the intersection from a stop position of the intersection; and forcibly execute the preceding vehicle following control to restart the vehicle stopped at the intersection to allow the vehicle to escape from the intersection, when the projection amount is greater than or equal to a threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
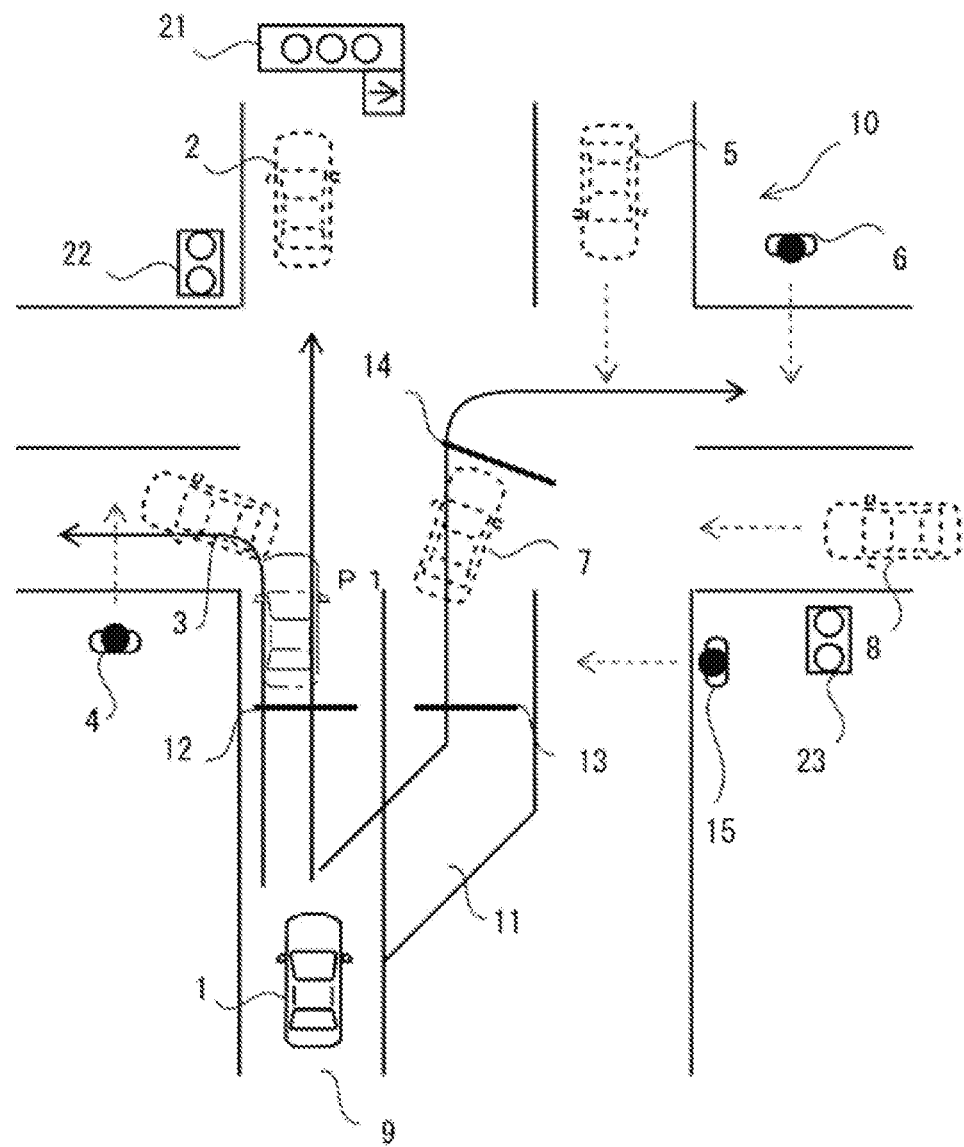
FIG. 1 is an explanatory diagram illustrating an example of a state where a vehicle to which a vehicle travel control apparatus according to one example embodiment of the disclosure is applicable is traveling toward an intersection by automated driving.

It is desirable that a vehicle that is adapted to travel by automated driving travel in accordance with traffic rules in a manner similar to that of a vehicle traveling in accordance with a driving operation of a driver who drives the vehicle.

When a preceding vehicle enters an intersection and stops in the intersection, a vehicle traveling under a basic automated driving control described above may possibly enter the intersection subsequent to the preceding vehicle and stop in the intersection. When a lighting state of a traffic light is changed thereafter, the vehicle traveling under the automated driving control and stopped in the intersection may possibly obstruct passage of, for example, other vehicles that are allowed to pass through the intersection in the lighting state of the traffic light that has changed. For example, it is not desirable to keep the vehicle stopped in an intersection where a traffic light is provided taking into consideration that some countries prohibit a vehicle from keeping stopped in an intersection by, for example, law.

Furthermore, when a traveling behavior of the vehicle traveling under the automated driving control differs greatly from that of the vehicle driven by the driver, the driver may possibly find the automated driving control uncomfortable.

A vehicle travel control apparatus is to control traveling of the vehicle to reduce such a case as much as possible.

It is desirable that a vehicle travel control apparatus improve traveling of a vehicle under a control of the vehicle travel control apparatus.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating an example of a state where a vehicle 1 to which a vehicle travel control apparatus according to a first example embodiment of the disclosure is applicable is traveling toward an intersection 10 by automated driving.

In FIG. 1, the vehicle 1 that is adapted to travel by the automated driving may be traveling toward the intersection 10 in a lane 9 on a road. The vehicle 1 may be, for example, an automobile. In one embodiment, the vehicle 1 may serve as a "vehicle". In one embodiment, the intersection 10 may serve as an "intersection".

At the intersection 10, a first preceding vehicle 2, a second preceding vehicle 3, and a third preceding vehicle 7 may be traveling in front of the vehicle 1 that is adapted to travel by the automated driving. The first preceding vehicle 2 may pass the intersection 10 straight through. The second preceding vehicle 3 may turn left at the intersection 10. The third preceding vehicle 7 may turn right at the intersection 10. In one embodiment, the first preceding vehicle 2, the second preceding vehicle 3, and the third preceding vehicle 7 may serve as a "preceding vehicle".

The first preceding vehicle 2 that has passed straight through the intersection 10 may possibly stop ahead of the intersection 10 due to, for example, a traffic jam.

In turning left at the intersection 10, the second preceding vehicle 3 may possibly stop in a vicinity of an exit of the intersection 10 while waiting for a pedestrian 4 who is crossing the road to pass.

The third preceding vehicle 7 may possibly stop at a right-turn stop line 14 in the intersection 10 in a right-turn lane 11 provided for vehicles to turn right at the intersection 10. The third preceding vehicle 7 may possibly stop at the right-turn stop line 14 to wait for an oncoming vehicle 5 or a pedestrian 6 who is crossing the road to pass.

In this case, the vehicle 1 that is adapted to travel by the automated driving may proceed toward the intersection 10 in accordance with the course of the vehicle 1. The vehicle 1 may also be referred to as an "own vehicle". The vehicle 1 may possibly stop behind the first preceding vehicle 2, the second preceding vehicle 3, or the third preceding vehicle 7.

Thereafter, for example, the first preceding vehicle 2 may restart traveling to move away from the intersection 10 when traffic starts to move.

When the pedestrian 4 finishes crossing, the second preceding vehicle 3 may restart traveling to turn left at the intersection 10.

When the oncoming vehicle 5 and the pedestrian 6 finish passing through the road, the third preceding vehicle 7 may restart traveling to turn right at the intersection 10.

It is possible for the vehicle 1 that is adapted to travel by the automated driving to pass through the intersection 10 subsequent to the first preceding vehicle 2, the second preceding vehicle 3, or the third preceding vehicle 7.

In some cases, traffic lights 21 to 23 may be provided at the intersection 10 for controlling traffic at the intersection 10. FIG. 1 illustrates the traffic light 21 for vehicles for the lane in which the vehicle 1 that is adapted to travel by the automated driving travels and the traffic lights 22 and 23 for pedestrians. In one embodiment, the traffic light 21 may serve as a "traffic light".

The lighting states of the traffic lights 22 and 23 for pedestrians may be switched between a blue lamp allowing the pedestrians 4 and 6 to cross and a red lamp prohibiting the pedestrians 4 and 6 from crossing.

The lighting state of the traffic light 21 for vehicles may be switched between a blue lamp allowing the vehicle to pass through, a red lamp prohibiting the vehicle from passing through, and a yellow lamp that turns on when the lighting state is to be changed from the blue lamp to the red lamp.

Additionally, some traffic lights 21 for vehicles may include a red arrow lamp that allows the third preceding vehicle 7 in, for example, the right-turn lane 11 to pass while the red lamp is turned on.

The traffic lights 21 to 23 may be brought into a lighting state that allows passage in time division for each direction of passage through the intersection 10. The traffic light for a direction different from the traffic light in the lighting state that allows passage may be brought into the lighting state that does not allow passage. This makes it possible for the vehicles and the pedestrians to check the lighting state of the corresponding traffic light and safely pass through the intersection 10.

The intersection 10 illustrated in FIG. 1 may further include a first stop line 12 and a second stop line 13.

The first stop line 12 may be provided before the intersection 10 in the lane 9 of the road on which the vehicle 1 that is adapted to travel by the automated driving is traveling.

The second stop line 13 may be provided before the intersection 10 in the right-turn lane 11.

For example, when the traffic light 21 for vehicles is in the lighting state that does not allow the vehicles to pass, the vehicle 1 is to stop at the first stop line 12 or the second stop line 13. This makes it possible for the vehicle 1 not to obstruct a fourth vehicle 8 traveling on an intersecting road in passing through the intersection 10.

Even in the case of the vehicle 1 traveling by the automated driving, the vehicle 1 is to travel in accordance with traffic rules to ensure safety at the intersection 10 while coping with various travel environments described above in a similar manner to a vehicle traveling by a driving operation of a driver who drives the vehicle.

For example, when any of the first to third preceding vehicles 2, 3, and 7 enters and stops in the intersection 10, the vehicle 1 traveling under the basic automated driving control described above may possibly enter the intersection 10 subsequent to the preceding vehicle 2, 3, or 7 and stop in the intersection 10.

When the lighting state of the traffic light 21 for vehicles is changed thereafter, the vehicle 1 traveling under the automated driving control and stopped at, for example, a position P1 in the intersection 10 may possibly obstruct passage of, for example, the fourth vehicle 8 that is allowed to pass through the intersection 10 in the lighting state of the traffic light 21 that has changed. The vehicle 1 is to refrain from keeping stopped in the intersection 10 where the traffic light 21 is provided taking into consideration that some countries prohibit a vehicle from keeping stopped in an intersection by, for example, law.

Furthermore, when the traveling behavior of the vehicle 1 traveling under the automated driving control differs greatly from the vehicle driven by the driver, the driver may possibly find the automated driving control uncomfortable.

A travel processor 32 of the vehicle 1 is to control traveling of the vehicle 1 to reduce such a case as much as possible.

For one reason described above, the automated driving control is to improve traveling of the vehicle 1 under the control.

Figure 2:
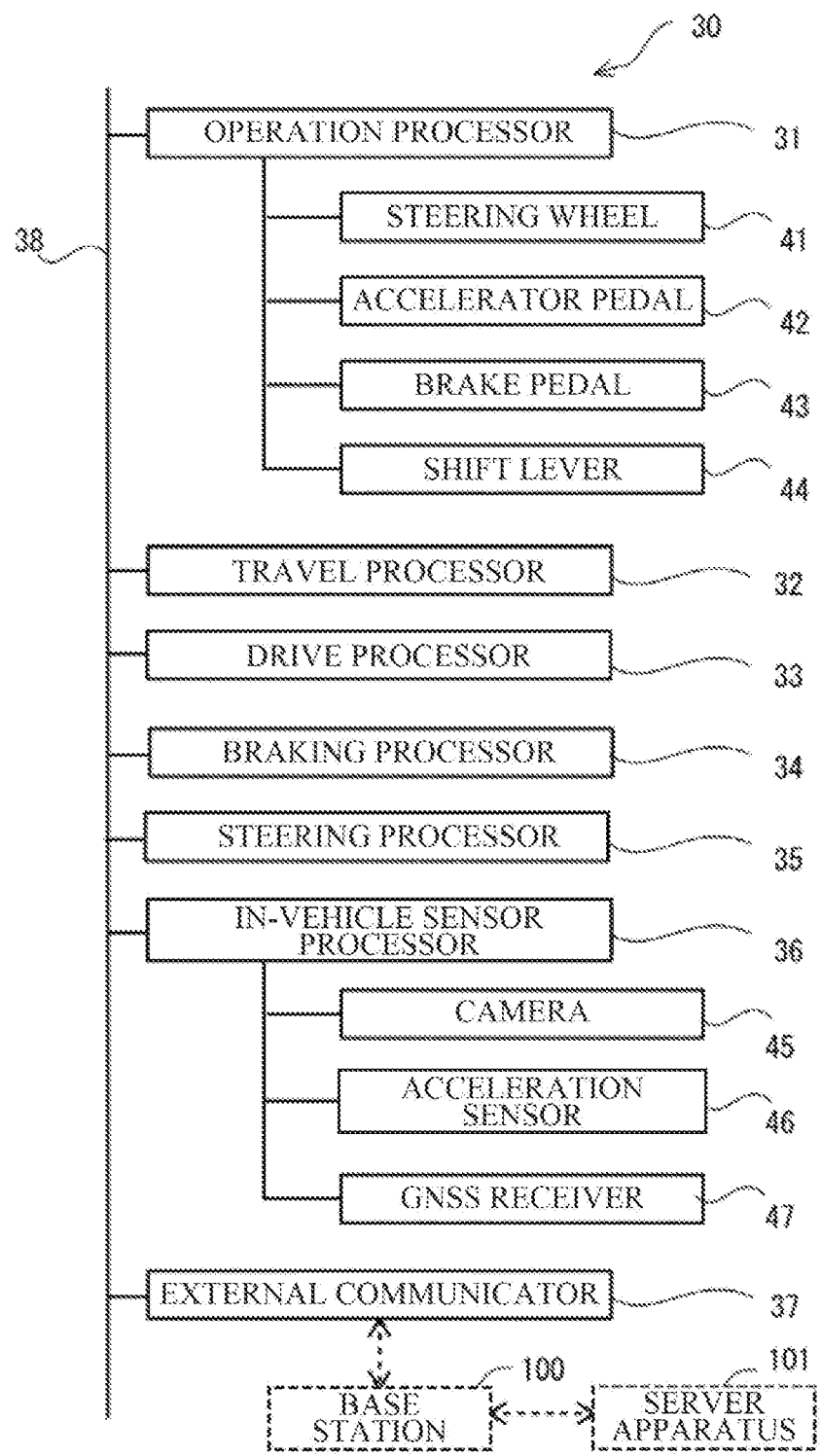
FIG. 2 is an explanatory diagram illustrating a vehicle control system provided on the vehicle illustrated in FIG. 1 and operates as the vehicle travel control apparatus.

FIG. 2 is an explanatory diagram illustrating a control system 30 of the vehicle 1. The control system 30 may be provided on the vehicle 1 of FIG. 1 and operate as a vehicle travel control apparatus.

The control system 30 of FIG. 2 may include multiple processors and a vehicle network 38 to which the processors are coupled. The vehicle network 38 may be compliant with a standard such as a controller area network (CAN) or a local interconnect network (LIN). It is possible for the processors to transmit and receive data to and from each other through the vehicle network 38.

FIG. 2 illustrates, as the processors, an operation processor 31, the travel processor 32, a drive processor 33, a braking processor 34, a steering processor 35, an in-vehicle sensor processor 36, and an external communicator 37. The control system 30 may include other processors.

Various operation members to be operated by an occupant in the vehicle 1 may be coupled to the operation processor 31. The operation members to be operated by the occupant may be provided in the vehicle 1 to control the traveling of the vehicle 1. Here, a steering wheel 41, an accelerator pedal 42, a brake pedal 43, and a shift lever 44 are illustrated as examples. The operation processor 31 may acquire an operation input of the occupant to each of the operation members and output operation data to another processor through the vehicle network 38.

A drive device that drives wheels of the vehicle 1 may be coupled to the drive processor 33. The drive device may include, for example, an engine, a motor, and a transmission, which are not illustrated. The drive processor 33 may acquire control data regarding driving provided from the vehicle network 38 and control an operation state of the drive device. This makes it possible for the vehicle 1 to, for example, accelerate or maintain a speed. Note that the control data regarding driving may be generated periodically mainly by the operation processor 31 in accordance with an operation amount of the accelerator pedal 42 operated by the occupant.

A braking device that brakes the wheels of the vehicle 1 may be coupled to the braking processor 34. The braking device may include, for example, a brake and a regenerative device, which are not illustrated. The braking processor 34 may acquire control data regarding braking from the vehicle network 38 and control an operation state of the braking device. This makes it possible for the vehicle 1 to, for example, decelerate or stop. Note that the control data regarding braking may be generated periodically mainly by the operation processor 31 in accordance with an operation amount of the brake pedal 43 operated by the occupant.

For example, a steering device, which is not illustrated, may be coupled to the steering processor 35. The steering processor 35 may acquire control data regarding steering from the vehicle network 38 and control an operation state of the steering device. This makes it possible for the vehicle 1 to, for example, travel rightward or leftward. Note that the control data regarding steering may be generated periodically mainly by the operation processor 31 in accordance with an operation amount of the steering wheel 41 operated by the occupant.

Various in-vehicle sensors provided in the vehicle 1 may be coupled to the in-vehicle sensor processor 36. Here, a camera 45, an acceleration sensor 46, and a global navigation satellite system (GNSS) receiver 47 are illustrated as examples of the in-vehicle sensors. In addition to the above, for example, light detection and ranging (Lidar) that scans an outside of the vehicle and generates space data of the outside of the vehicle may be coupled to the in-vehicle sensor processor 36. The space data may replace or interpolate images of the camera 45.

The camera 45 may be provided, for example, on the vehicle 1 and oriented forward. The camera 45 may capture images of a course ahead in which the vehicle 1 is traveling to advance. Additionally, for example, the camera 45 may capture images of surroundings of the vehicle 1 in 360 degrees. Alternatively, the camera 45 may be a stereo camera including multiple cameras disposed with a predetermined distance therebetween. In one embodiment, the camera 45 may serve as a "camera".

The acceleration sensor 46 may detect a current acceleration rate of the vehicle 1 that is traveling. The acceleration sensor 46 may detect the acceleration rate in directions of orthogonal axes.

The GNSS receiver 47 may receive electric waves from GNSS satellites and generate data regarding a current position of the vehicle 1 and a current time.

The in-vehicle sensor processor 36 may acquire detection data from various in-vehicle sensors provided in the vehicle 1 and output the detection data to other processors through the vehicle network 38. The in-vehicle sensor processor 36 may process the detection data from the in-vehicle sensors and output the processed detection data to other processors through the vehicle network 38. For example, the in-vehicle sensor processor 36 may generate data on a magnitude of a speed and a direction of traveling of the vehicle 1 and data regarding yaw, pitch, and roll indicating a behavior of the vehicle 1, based on the acceleration rate detected by the acceleration sensor 46. The in-vehicle sensor processor 36 may output the generated data as detection data to other processors through the vehicle network 38. This makes it possible for the in-vehicle sensor processor 36 to output, for example, data on the traveling state including the current position of the vehicle 1 to other processors through the vehicle network 38.

Further, the in-vehicle sensor processor 36 may analyze images captured by the camera 45 provided to capture images of the outside of the vehicle 1. Based on the analysis, the in-vehicle sensor processor 36 may generate various kinds of data regarding, for example, other vehicles such as the preceding vehicles 2, 3, and 7 and the oncoming vehicle 5, the pedestrians 4 and 6, and the intersection 10, which are illustrated in FIG. 1. The in-vehicle sensor processor 36 may output thus obtained detection data to other processors through the vehicle network 38. This makes it possible for the in-vehicle sensor processor 36 to acquire and output data including, for example, data on a stop position at an intersection through which the vehicle 1 passes, data on a remaining distance to the stop position, data on a lighting state of a traffic light, and data on a preceding vehicle traveling in front of the vehicle 1. Here, the stop position of the intersection may be, for example, the position of a stop line.

The external communicator 37 may establish a wireless communication path with a base station 100 outside the vehicle 1. The external communicator 37 may transmit and receive data to and from a server apparatus 101 using the established wireless communication path. The server apparatus 101 may be, for example, a server for an advanced driver assistance system (ADAS), a server provided by an automobile manufacturer, or a server for emergency response. The external communicator 37 may transmit and receive data to and from the server apparatuses 101 as needed.

The travel processor 32 may generate a control value for causing the vehicle 1 to travel under the automated driving control and output the control value to the drive processor 33, the braking processor 34, and the steering processor 35.

Further, the travel processor 32 may acquire data on the driving operation performed by a driver who drives the vehicle 1 from the operation processor 31 and generate a control value corresponding to the data. The travel processor 32 may output the control value to the drive processor 33, the braking processor 34, and the steering processor 35. Alternatively, the travel processor 32 may generate and output an adjusted control value to the drive processor 33, the braking processor 34, and the steering processor 35.

This makes it possible for the vehicle 1 to travel by the automated driving. The automated driving is classified into levels 1 to 5. For example, the automated driving of level 1 assists a driving operation performed by a driver who drives a vehicle. The automated driving of level 5 is referred to as fully automated driving and causes the vehicle 1 to travel without operation performed by the driver who drives the vehicle 1. Many manufacturers at the present stage develop commercial automobiles of level 2 and level 3.

The vehicle 1 that is adapted to travel by such automated driving may basically achieve the automated driving by combining multiple travel controls including, for example, the preceding vehicle following control, the lane keep control, and the interference avoidance control.

The lane keep control may control, for example, steering to keep the vehicle 1 within the lane of the road in which the vehicle 1 is traveling.

The preceding vehicle following control may control the vehicle 1 to follow the preceding vehicle that is traveling in front of the vehicle 1 while keeping an inter-vehicle distance corresponding to a vehicle speed between the vehicle 1 and the preceding vehicle. When the vehicle 1 comes close to the preceding vehicle, the preceding vehicle following control may cause the vehicle 1 to decelerate in accordance with a speed of the preceding vehicle. When the preceding vehicle stops, the preceding vehicle following control may cause the vehicle 1 to stop with at least a minimum inter-vehicle distance provided between the vehicle 1 and the preceding vehicle. Note that, when there is no preceding vehicle close to the vehicle 1 in the lane of the road in which the vehicle 1 is traveling, the preceding vehicle following control may basically control the vehicle 1 to travel at a speed limit of the road. The preceding vehicle following control as described above may be sometimes incorporated in the vehicle 1 as, for example, an adaptive cruise control (ACC).

The interference avoidance control helps to prevent interference of the vehicle with an obstacle if there is an obstacle or if it predicted that there will be an obstacle on the course on which the vehicle 1 is traveling. The obstacle may include, for example, a preceding vehicle, an oncoming vehicle, a pedestrian, a cyclist, and a curb. The interference avoidance control may predict interference between the vehicle 1 and the obstacle on the course by, for example, analyzing images captured by the camera 45 mounted on the vehicle 1. If the interference with the obstacle is predicted, the interference avoidance control may execute the control to avoid or help prevent the interference.

With the basic automated driving control as described above, the travel processor 32 is to cause the vehicle 1 to smoothly travel while ensuring safety on a road including an intersection having a traffic light under the automated driving control, based on images captured by the camera 45 mounted on the vehicle 1. The vehicle 1 is to travel in accordance with the traffic rules to ensure safety at the intersection 10 while coping with various travel environments occurring at the intersection 10 as described in FIG. 1, for example.

The travel processor 32 may basically cope with various travel environments occurring at the intersection under the preceding vehicle following control.

Figure 3:
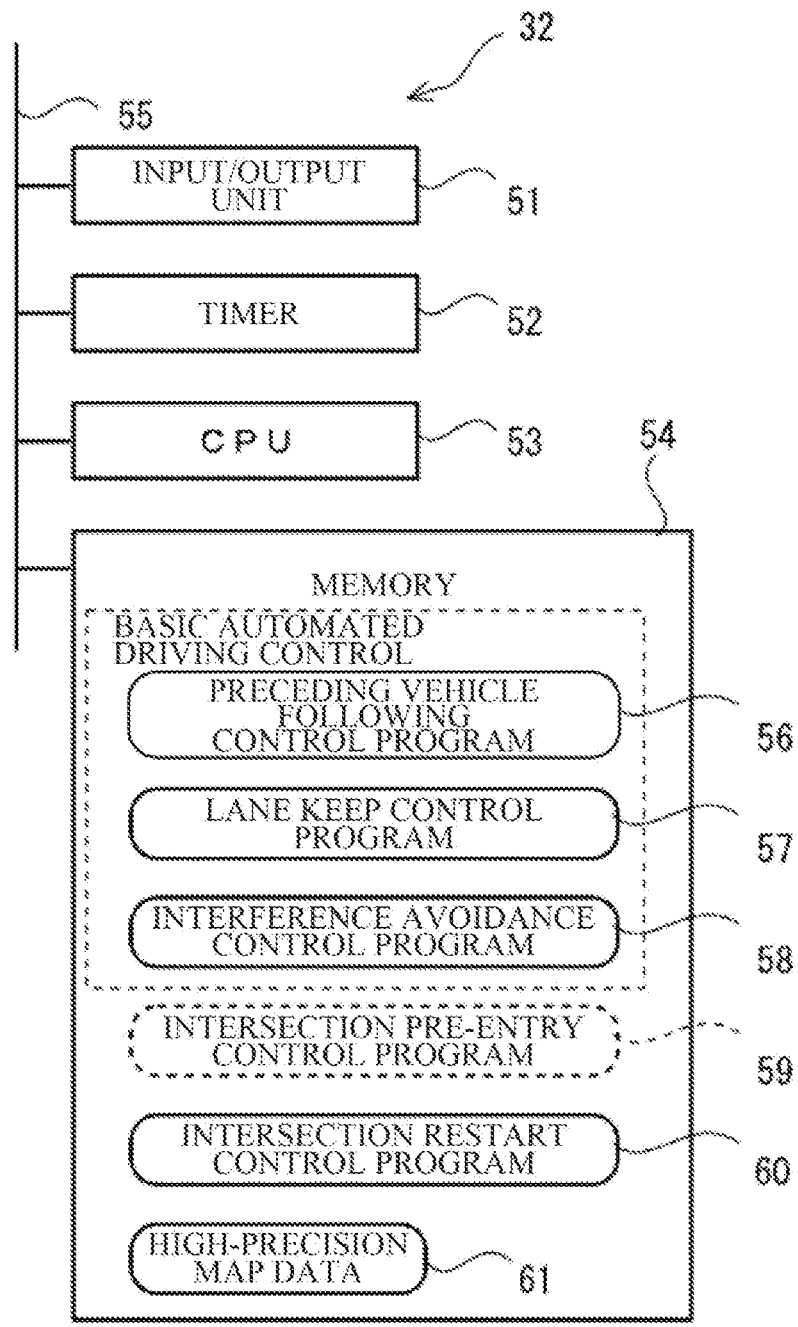
FIG. 3 is a configuration diagram illustrating a basic configuration of a travel processor illustrated in FIG. 2.

FIG. 3 is a configuration diagram illustrating a basic configuration of the travel processor 32 illustrated in FIG. 2.

The travel processor 32 illustrated in FIG. 3 may include an input/output unit 51, a timer 52, a central processing unit (CPU) 53, a memory 54, and an internal bus 55 to which these components are coupled.

Note that other processors illustrated in FIG. 2 may have a basic configuration similar to the configuration illustrated in FIG. 3.

The input/output unit 51 may be coupled to the vehicle network 38, and transmit and receive data between the travel processor 32 and other processors.

The timer 52 may measure a time or a time period. The time of the timer 52 may be calibrated by the current time generated by the GNSS receiver 47.

The memory 54 may store programs to be executed by the CPU 53 and various kinds of data. Here, a preceding vehicle following control program 56, a lane keep control program 57, an interference avoidance control program 58, an intersection pre-entry control program 59, an intersection restart control program 60, and high-precision map data 61 for the automated driving are illustrated as examples. The memory 54 may include, for example, a non-volatile semiconductor memory, a hard disk drive (HDD), and a random access memory (RAM).

The CPU 53 may read and execute the programs stored in the memory 54. This may implement a processor in the travel processor 32. The processor may control operation of the travel processor 32 and execute the travel controls performed by the automated driving of the vehicle 1.

The CPU 53 of the travel processor 32 may execute the preceding vehicle following control program 56 to generate a control value for the vehicle 1 to travel following the preceding vehicle. The CPU 53 of the travel processor 32 may output the generated control value to, for example, the drive processor 33 and the braking processor 34.

The CPU 53 of the travel processor 32 may execute the lane keep control program 57 to generate a control value for the vehicle 1 to travel while being kept within the lane in which the vehicle 1 is traveling. The CPU 53 of the travel processor 32 may output the generated control value to, for example, the steering processor 35 and the braking processor 34.

The CPU 53 of the travel processor 32 may execute the interference avoidance control program 58 to generate a control value for the vehicle 1 to travel while avoiding an obstacle in the course of the vehicle 1. The CPU 53 of the travel processor 32 may output the generated control value to, for example, the steering processor 35 and the braking processor 34.

This makes it possible for the vehicle 1 to travel following the preceding vehicle while avoiding an obstacle in the course and basically being kept within the lane in which the vehicle 1 is traveling.

In addition to the programs for the basic automated driving control as described above, the CPU 53 of the travel processor 32 may further execute the intersection pre-entry control program 59 and the intersection restart control program 60. In the example embodiment, a description is given of a case where the CPU 53 of the travel processor 32 executes the intersection restart control program 60. The intersection pre-entry control program 59 will be described in a second example embodiment.

Note that, as will be described later, the intersection pre-entry control program 59 and the intersection restart control program 60 may be configured to control execution and operations of the basic automated driving control instead of generating control values to be outputted to, for example, the drive processor 33, the braking processor 34, and the steering processor 35.

In contrast, if, for example, the intersection pre-entry control program 59 or the intersection restart control program 60 is configured to generate control values to be outputted to devices such as the drive processor 33 in the similar manner to the basic automated driving control program, the CPU 53 of the travel processor 32 is to manage and control the basic automated driving control and driving controls performed by the intersection pre-entry control program 59 and the intersection restart control program 60 to be switched in accordance with, for example, the traveling state. The control may become complicated in the entire travel control. This makes it difficult to achieve reliability in the control of the entire travel control. The combination of the programs in the example embodiment is unlikely to cause such an issue. In one embodiment, the CPU 53 may serve as an "automated driving processor".

Figure 4:
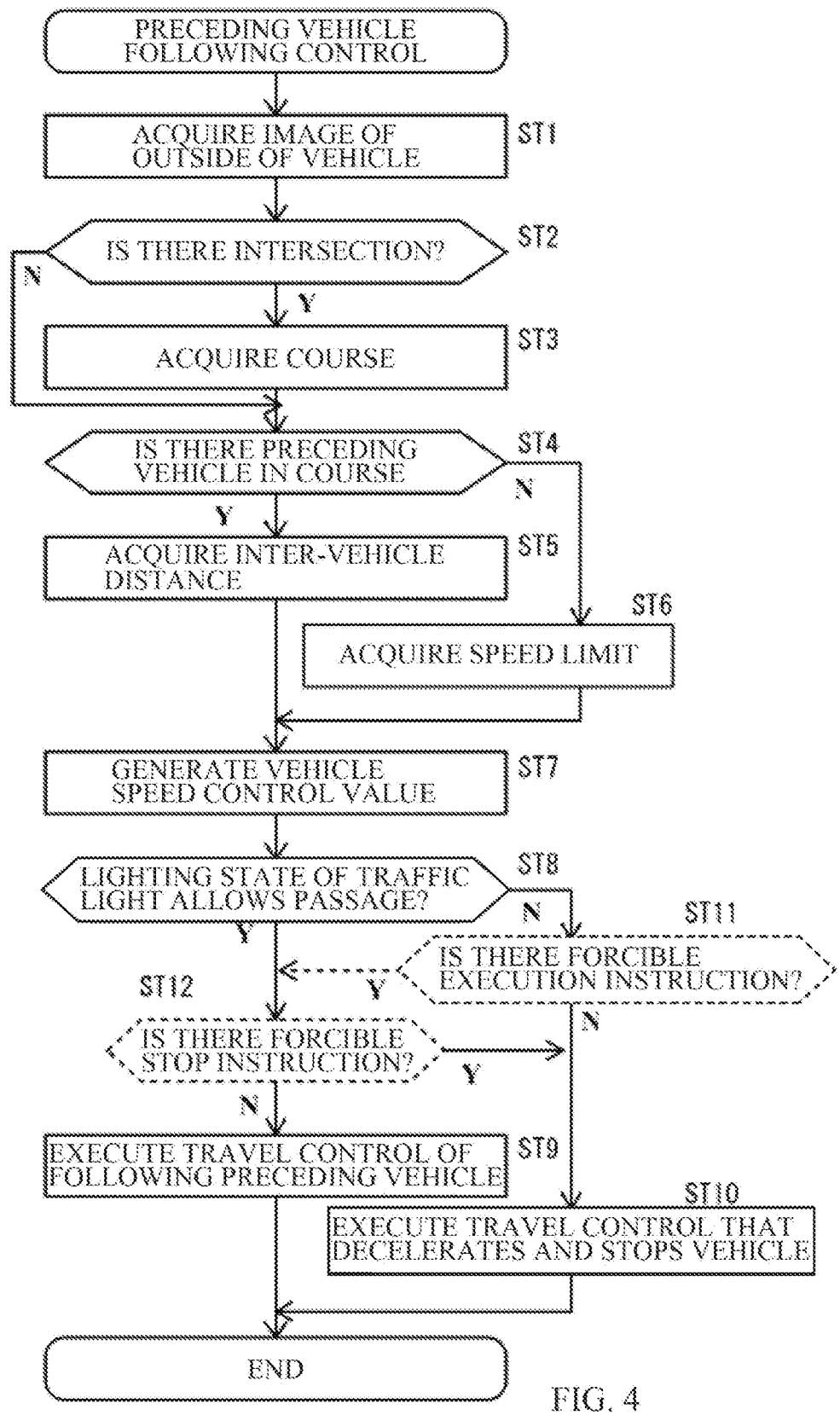
FIG. 4 is a flowchart of an example of a preceding vehicle following control executed for a basic automated driving control by a central processing unit (CPU) of the travel processor illustrated in FIG. 3.

FIG. 4 is a flowchart of an example of the preceding vehicle following control executed for the basic automated driving control by the CPU 53 of the travel processor 32 illustrated in FIG. 3.

The CPU 53 may repeatedly execute the preceding vehicle following control program 56 when the vehicle 1 travels by the automated driving. Accordingly, the preceding vehicle following control illustrated in FIG. 4 may be repeatedly executed.

In step ST1, the CPU 53 of the travel processor 32 may acquire a latest image of a region in front of the vehicle 1 captured by the camera 45 mounted on the vehicle 1 from the in-vehicle sensor processor 36. Additionally, the CPU 53 may acquire, from the in-vehicle sensor processor 36, various kinds of data regarding other vehicles, pedestrians, the intersection, presence or absence of the traffic light, and the lighting state. The various kinds of data may be results of analyzing images of the region in front of the vehicle 1 captured by the camera 45. Note that, when it is difficult to acquire these pieces of data, the CPU 53 may analyze the images by itself to acquire various kinds of data regarding other vehicles, pedestrians, and intersections.

In step ST2, the CPU 53 of the travel processor 32 may determine whether there is an intersection in the course in which the vehicle 1 is traveling by the automated driving, based on the data acquired in step ST1. If there is an intersection in the course (step ST2: Y), the CPU 53 may advance the process to step ST3. When there is no intersection in the course (step ST2: N), the CPU 53 may advance the process to step ST4.

In step ST3, the CPU 53 of the travel processor 32 may acquire data on a course through the intersection that exists on the course of the vehicle 1 and through which the vehicle 1 is to pass by the automated driving. The CPU 53 may acquire the course of the vehicle 1 in the intersection, based on, for example, a path set in advance. The path may be set when the vehicle 1 starts traveling, based on the high-precision map data 61, for example. The vehicle 1 may go straight through the intersection, turn left at the intersection, or turn right at the intersection.

In step ST4, the CPU 53 of the travel processor 32 may determine whether there is a preceding vehicle in the course of the own vehicle, based on the data acquired in step ST1. If there is a preceding vehicle in the course of the own vehicle (step ST4: Y), an image of the preceding vehicle can be captured by the camera 45. If there is a preceding vehicle in the course of the own vehicle (step ST4: Y), the CPU 53 may advance the process to step ST5. If there is no preceding vehicle in the course of the own vehicle (step ST4: N), the CPU 53 may advance the process to step ST6.

In step ST5, the CPU 53 of the travel processor 32 may acquire an inter-vehicle distance between the own vehicle and the preceding vehicle. The preceding vehicle may be captured in an image taken by the camera 45 at a portion corresponding to a direction and a distance relative to the vehicle 1. The CPU 53 may calculate a relative direction and a relative distance of the preceding vehicle from the vehicle 1, which is the own vehicle, based on, for example, a captured position of the preceding vehicle in the image. This makes it possible for the CPU 53 to acquire the inter-vehicle distance between the vehicle 1 and the preceding vehicle. Thereafter, the CPU 53 may advance the process to step ST7.

In step ST6, the CPU 53 of the travel processor 32 may acquire a speed limit of a road or a lane in which the vehicle 1 is traveling by the automated driving. If a sign indicating the speed limit of the road is provided, the sign can be captured in an image taken by the camera 45. The CPU 53 may acquire the speed limit of the vehicle 1 by, for example, analyzing the image taken by the camera 45.

In step ST7, the CPU 53 of the travel processor 32 may generate a vehicle speed control value for the vehicle 1. The CPU 53 may generate the vehicle speed control value, based on the speed corresponding to the inter-vehicle distance between the vehicle 1 and the preceding vehicle acquired in step ST5 or the speed limit for the road or the lane acquired in step ST6.

In step ST8, the CPU 53 of the travel processor 32 may determine whether the lighting state of the traffic light at the intersection included in the image taken by the camera 45 allows passage along the course acquired in step ST3.

For example, in a case of a course in which the vehicle 1 is to pass straight through the intersection, the CPU 53 may determine whether the traffic light at the intersection is in the lighting state indicating that the vehicle 1 is allowed to pass straight through the intersection. When the traffic light illuminates a blue lamp, the vehicle 1 may be allowed to pass straight through the intersection. When the traffic light illuminates a lamp other than the blue lamp, the vehicle 1 may be prohibited from passing straight through the intersection.

Further, in a case of a course in which the vehicle 1 is to turn left at the intersection, the CPU 53 may determine whether the traffic light at the intersection is in the lighting state indicating that the vehicle 1 is allowed to turn left. When the traffic light illuminates the blue lamp, the vehicle 1 may be allowed to turn left at the intersection. When the traffic light illuminates a lamp other than the blue lamp, the vehicle 1 may be prohibited from turning left at the intersection.

Further, in a case of a course in which the vehicle 1 is to turn right at the intersection, the CPU 53 may determine whether the traffic light at the intersection is in the lighting state indicating that the vehicle 1 is allowed to turn right. When the traffic light illuminates the blue lamp, the vehicle 1 may be allowed to turn right at the intersection. When the traffic light illuminates a lamp other than the blue lamp, the vehicle 1 may be basically prohibited from turning right at the intersection. Note that even if the traffic light illuminates a red lamp, the vehicle 1 may be allowed to turn right at the intersection when a blue arrow lamp for right turn is also illuminated.

Further, if the traffic light is in the lighting state indicating that the vehicle 1 is allowed to pass along the course (step ST8: Y), the CPU 53 may advance the process to step ST9.

If the traffic light is not in the lighting state indicating that the vehicle 1 is allowed to pass along the course (step ST8: N), the CPU 53 may advance the process to step ST10.

In step ST9, the CPU 53 of the travel processor 32 may execute the travel control of the preceding vehicle following control to cause the vehicle 1 to pass through the intersection along the course. As a result, it is possible for the CPU 53 to control the traveling of the vehicle 1, as the automated driving control, to keep the vehicle speed below the speed limit of the road and follow the preceding vehicle traveling in front of the vehicle 1 while maintaining the inter-vehicle distance corresponding to the vehicle speed between the vehicle 1 and the preceding vehicle. When the preceding vehicle decelerates or stops at the intersection, it is possible for the CPU 53 to control the traveling of the vehicle 1 to decelerate or stop accordingly. Additionally, it is possible for the CPU 53 to stop the vehicle 1 immediately after the preceding vehicle to secure a minimum inter-vehicle distance between the preceding vehicle that is stopped and the vehicle 1.

Note that the CPU 53 may execute the lane keep control that keeps the vehicle 1 in the lane in which the vehicle 1 is traveling and the interference avoidance control that helps to prevent interference of the vehicle 1 together with the preceding vehicle following control. As a result, it is possible for the vehicle 1 to pass through the intersection following the preceding vehicle while keeping the vehicle 1 in the lane in which the vehicle 1 is traveling. Also, for example, when there is an oncoming vehicle passing through the intersection, or when there is a pedestrian crossing the intersection or somewhere in the vicinity of the intersection, the CPU 53 may decelerate and stop the vehicle 1 to help prevent interference between the vehicle 1 and the oncoming vehicle or the pedestrian.

Thereafter, the CPU 53 may end the control.

In step ST10, the CPU 53 of the travel processor 32 may execute the travel control to decelerate and stop the vehicle 1, causing the vehicle 1 to stop before entering the intersection. Here, the CPU 53 may control a deceleration rate until the vehicle 1 stops to such an extent that it is possible to bring the vehicle speed to 0 within the remaining distance to the stop line, for example. This makes it possible for the vehicle 1 to stop, for example, at the first stop line 12 or the second stop line 13 illustrated in FIG. 1. Thereafter, the CPU 53 may end the control. In the next and subsequent preceding vehicle following control illustrated in FIG. 4, when it is determined, in step ST8, that the lighting state of the traffic light at the intersection allows passage, it is possible for the CPU 53 to execute step ST9 and start the travel control of the preceding vehicle following control to cause the vehicle 1 to follow the preceding vehicle. It is possible for the vehicle 1 that has stopped at the intersection due to the traffic light to restart traveling to follow the preceding vehicle.

Note that the preceding vehicle following control illustrated in FIG. 4 is an example. The preceding vehicle following control may be any control that makes it possible to control the traveling of the vehicle 1 to at least follow the preceding vehicle traveling in front of the vehicle 1 while keeping the inter-vehicle distance corresponding to the vehicle speed between the vehicle 1 and the preceding vehicle.

As illustrated in FIG. 4, a control such as the preceding vehicle following control for the automated driving control is to basically execute various processes, and the control may already be complicated. As the content of the control increases, the delay of the control may increase, which can affect the real-time performance of the control.

However, the vehicle 1 traveling by the automated driving is to do more than simply pass through the intersection without interfering with, for example, the oncoming vehicle and the pedestrian on a predetermined course.

For example, while the vehicle 1 traveling by the automated driving is entering straight into the intersection subsequent to the preceding vehicle, the lighting state of the traffic light at the intersection may possibly be switched from the one indicating that the vehicle 1 is allowed to pass straight through the intersection to the one indicating that the vehicle 1 is prohibited from passing through the intersection.

While the vehicle 1 traveling by the automated driving is entering the intersection to turn left subsequent to the preceding vehicle, the lighting state of the traffic light at the intersection may possibly be switched from the one indicating that the vehicle 1 is allowed to turn left to the one indicating that the vehicle 1 is prohibited from passing through.

While the vehicle 1 traveling by the automated driving is entering the intersection to turn right subsequent to the preceding vehicle, the lighting state of the traffic light at the intersection may possibly be switched from the one indicating that the vehicle 1 is allowed to turn right to the one indicating that the vehicle 1 is prohibited from passing through.

After the lighting state of the traffic light at the intersection has changed, the vehicle 1 is not to obstruct, for example, the fourth vehicle 8 traveling on the intersecting road as illustrated in, for example, FIG. 1 in passing through the intersection. The vehicle 1 traveling by the automated driving is not to obstruct, for example, the fourth vehicle 8 in passing through the intersection even after the lighting state of the traffic light at the intersection has changed.

In the example embodiment, upon determining, in step ST8, that the traffic light is not in the lighting state indicating that the vehicle 1 is allowed to pass along the course (step ST8: N), the CPU 53 of the travel processor 32 may advance the process to step ST11.

In step ST11, the CPU 53 of the travel processor 32 may determine whether there is an instruction, from other controls, to forcibly execute a preceding vehicle following process. If there is no instruction to forcibly execute the preceding vehicle following process (step ST11: N), the CPU 53 may advance the process to step ST10 and execute a travel control that decelerates and stops the vehicle 1.

In contrast, if there is an instruction, from other controls, to forcibly execute the preceding vehicle following process (step ST11: Y), the CPU 53 may advance the process to step ST9. In this case, the CPU 53 may advance the process to step ST9 even if it is determined in its own process in FIG. 4 that the traffic light is not in the lighting state indicating that the vehicle 1 is allowed to pass along the course. The CPU 53 may execute the preceding vehicle following process of step ST9.

Furthermore, in the example embodiment, upon determining, in step ST8, that the traffic light is in the lighting state indicating that the vehicle 1 is allowed to pass along the course (step ST8: Y), the CPU 53 of the travel processor 32 may advance the process to step ST12.

In step ST12, the CPU 53 of the travel processor 32 may determine whether there is an instruction, from other controls, to forcibly stop the preceding vehicle following process. When there is no instruction to forcibly stop the preceding vehicle following process (step ST12: N), the CPU 53 may advance the process to step ST9 and execute the preceding vehicle following process.

In contrast, when there is an instruction, from other controls, to forcibly stop the preceding vehicle following process (step ST12: Y), the CPU 53 may advance the process to step ST10. In this case, the CPU 53 may advance the process to step ST10 even if it is determined in its own process in FIG. 4 that the traffic light is in the lighting state indicating that the vehicle 1 is allowed to pass along the course. The CPU 53 may execute the travel control that decelerates and stops the vehicle 1 in step ST10.

Figure 5:
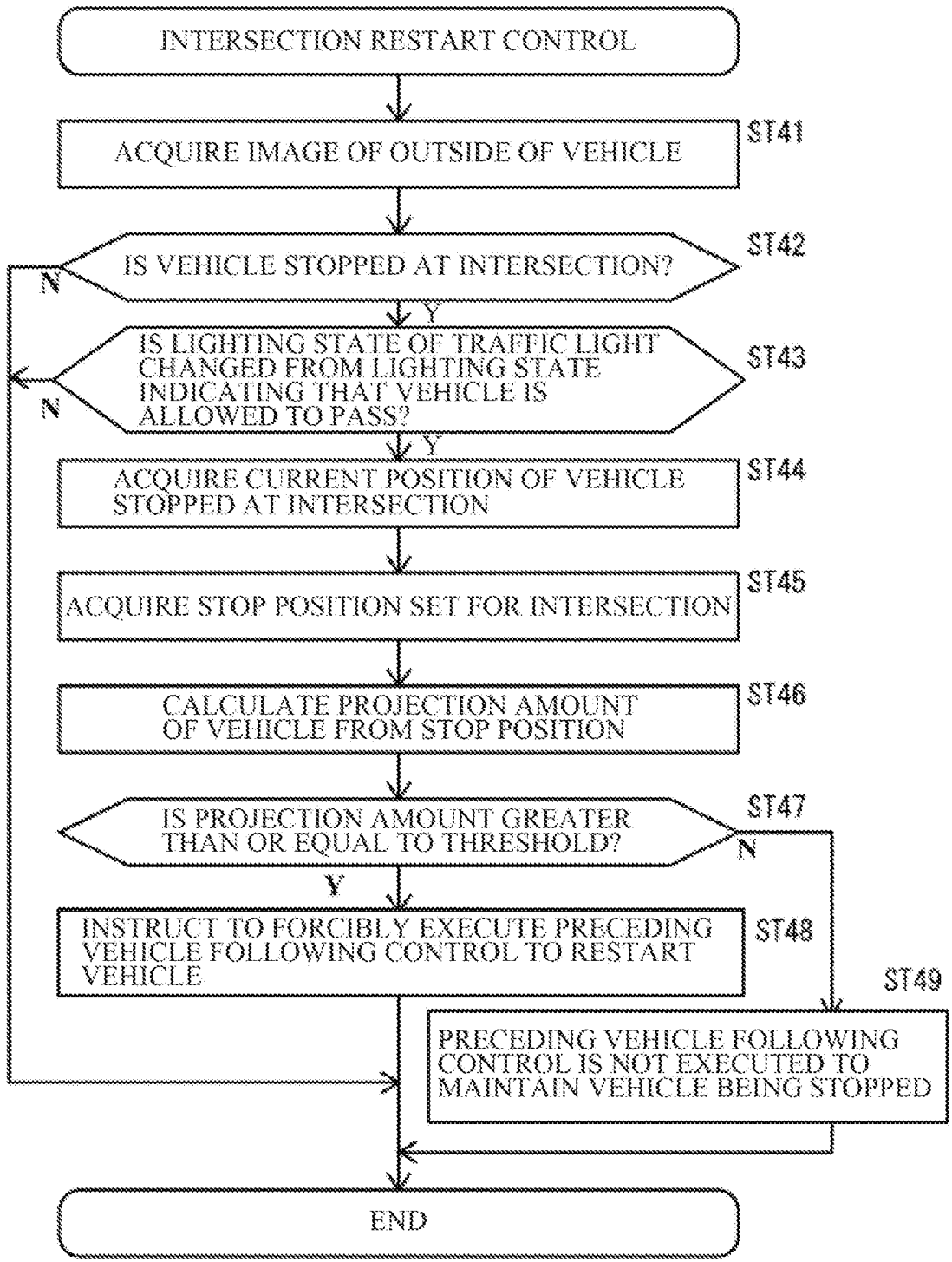
FIG. 5 is a flowchart of an intersection restart control executed by the CPU of the travel processor illustrated in FIG. 3 together with the basic automated driving control.

FIG. 5 is a flowchart of an intersection restart control executed by the CPU 53 of the travel processor 32 illustrated in FIG. 3 together with the basic automated driving control.

The CPU 53 may repeatedly execute the intersection restart control of FIG. 5 together with the basic automated driving control.

In step ST41, the CPU 53 of the travel processor 32 may acquire a latest image of a region in front of the vehicle 1 captured by the camera 45 mounted on the vehicle 1 from the in-vehicle sensor processor 36. Additionally, the CPU 53 may acquire, from the in-vehicle sensor processor 36, various kinds of data regarding other vehicles, pedestrians, intersections, presence or absence of the traffic light, and the lighting state. The various kinds of data may be results of analyzing images of the region in front of the vehicle 1 captured by the camera 45. When it is difficult to acquire these pieces of data, the CPU 53 may analyze the images by itself to acquire various kinds of data regarding other vehicles, pedestrians, and intersections.

In step ST42, the CPU 53 of the travel processor 32 may determine whether the own vehicle is stopped at the intersection, based on, for example, the speed of the vehicle 1, which is the own vehicle, and the images. The CPU 53 may determine whether the own vehicle is stopped at the intersection, based on latest position data from the GNSS receiver 47 and the high-precision map data 61. For example, when the own vehicle is stopped in the intersection subsequent to the preceding vehicle, the CPU 53 may determine that the own vehicle is stopped at the intersection (step ST42: Y). Furthermore, when the vehicle is stopped at the stop line at the intersection, the CPU 53 may determine that the own vehicle is stopped at the intersection (step ST42: Y). In these cases, the CPU 53 may advance the process to step ST43. If it is not determined that the own vehicle is stopped at the intersection (step ST42: N), the CPU 53 may end the control.

In step ST43, the CPU 53 of the travel processor 32 may determine whether the lighting state of the traffic light for the intersection included in the image taken by the camera 45 has changed from the lighting state indicating that the vehicle 1 is allowed to pass. If the lighting state of the traffic light is changed from the lighting state indicating that the vehicle 1 is allowed to pass (step ST43: Y), the CPU 53 may advance the process to step ST44. If the lighting state of the traffic light has not changed from the lighting state indicating that the vehicle 1 is allowed to pass (step ST43: N), the CPU 53 may end the control.

In step ST44, the CPU 53 of the travel processor 32 may acquire a current position of the own vehicle stopped at the intersection. The CPU 53 may acquire the current position of the own vehicle stopped at the intersection, based on, for example, the latest position data provided from the GNSS receiver 47 and the high-precision map data 61.

Here, the CPU 53 may acquire the position of the GNSS receiver 47 as the current position of the own vehicle at the intersection. In some embodiments, any position that is forward of a seating position of the driver of the vehicle 1 may be acquired as the current position. This makes it possible to make a determination equivalent to the determination made by the driver. This helps to reduce uncomfortableness felt by the driver.

In step ST45, the CPU 53 of the travel processor 32 may acquire the stop position for the intersection where the own vehicle is stopped. The CPU 53 may acquire a position of the stop line for the lane in which the vehicle 1 is traveling as the stop position at the intersection. The CPU 53 may acquire, for example, the positions of the first stop line 12 and the second stop line 13 of the intersection 10 illustrated in, for example, FIG. 1 captured in the images taken by the camera 45 as the stop positions for the intersection 10. The CPU 53 may acquire data on the stop line in the high-precision map data 61 as the stop position for the intersection. Furthermore, when it is possible for the vehicle 1 to stop in the intersection 10 in the right-turn lane 11, the CPU 53 may acquire the position of the right-turn stop line 14 as the stop position for the intersection 10. In one embodiment, the first stop line 12, the second stop line 13, and the right-turn stop line 14 may serve as a "stop position".

In step ST46, the CPU 53 of the travel processor 32 may calculate a projection amount of the current position of the vehicle 1 stopped at the intersection from the stop position of the intersection.

In step ST47, the CPU 53 of the travel processor 32 may determine whether the projection amount calculated in step ST46 is greater than or equal to a threshold. Here, the threshold may be, for example, approximately 0.5 meters. If the projection amount is greater than or equal to the threshold (step ST47: Y), the CPU 53 may advance the process to step ST48. If the projection amount is not greater than or equal to the threshold (step ST47: N), the CPU 53 may advance the process to step ST49.

In step ST48, the CPU 53 of the travel processor 32 may provide an instruction to forcibly execute the preceding vehicle following process. Thus, in step ST11 of the preceding vehicle following control in FIG. 4, the CPU 53 of the travel processor 32 may determine that there is an instruction to forcibly execute the preceding vehicle following process and advance the process to step ST9 to execute the preceding vehicle following process. This makes it possible for the vehicle 1 that is stopped at the intersection to restart under the preceding vehicle following control and finish passing through the intersection. Thereafter, the CPU 53 may end the control.

In step ST49, the CPU 53 of the travel processor 32 may provide no instruction to forcibly execute the preceding vehicle following process. As a result, the vehicle 1 that has stopped at the intersection maintains being stopped.

In this manner, in the example embodiment, the CPU 53 of the travel processor 32 determines whether the vehicle 1 is to be restarted when the traffic light at the intersection is changed from the lighting state indicating that the vehicle 1 is allowed to pass along the course of the vehicle 1 after the vehicle 1 has stopped at the intersection having the traffic light. It is expectable that determination of restarting and stopping of the vehicle 1 that is stopped at the intersection be made in a manner similar to the determination made by the driver. The driver may be less likely to feel uncomfortable with regard to the determination of restarting and stopping made by the travel processor 32.

As described above, in the example embodiment, the vehicle 1 is adapted to travel on the road including the intersection having the traffic light under the automated driving control including the preceding vehicle following control. Furthermore, the CPU 53, which serves as the automated driving processor in one embodiment, determines whether the vehicle 1 is allowable to start moving under the automated driving control, based on the projection amount of the current position of the vehicle 1 stopped at the intersection from the stop position of the intersection, when the traffic light at the intersection is changed from the lighting state indicating that the vehicle 1 is allowed to pass along the course of the vehicle 1 after the vehicle 1 is stopped at the intersection having the traffic light. The CPU 53 forcibly executes the preceding vehicle following control to restart the vehicle 1 stopped at the intersection to allow the vehicle 1 to escape from the intersection when the projection amount is greater than or equal to the threshold.

This makes it possible to prevent the vehicle 1 from continuing to stop in the intersection after the traffic light at the intersection has changed from the lighting state indicating that the vehicle 1 is allowed to pass along the course of the vehicle 1. The vehicle 1 becomes unlikely to obstruct the passage through the intersection of the fourth vehicle 8 or a pedestrian 15 that is allowed to go after the lighting state of the traffic light at the intersection has changed.

The example embodiment helps to improve the traveling of the vehicle 1 under the control of the vehicle travel control apparatus.

Second Example Embodiment

Next, a description is given of the second example embodiment of the disclosure. In the second example embodiment, the same reference numerals are used for components similar to those in the above-described example embodiment, and illustration and description thereof are omitted. Differences from the above-described example embodiment will be mainly described.

Figure 6:
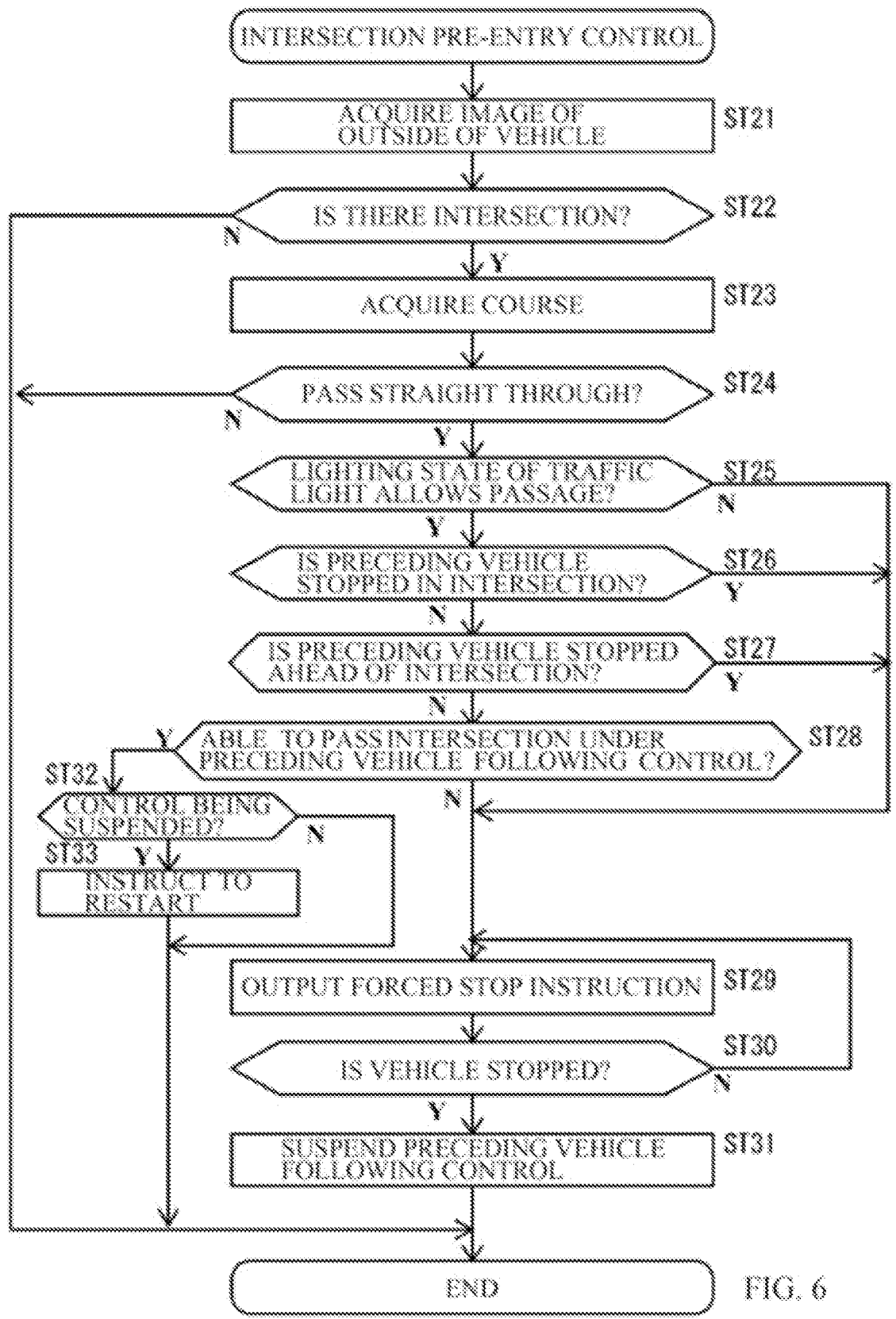
FIG. 6 is a flowchart of an intersection pre-entry control executed by a CPU of a travel processor according to one example embodiment of the disclosure together with the basic automated driving control.

FIG. 6 is a flowchart of the intersection pre-entry control executed by the CPU 53 of the travel processor 32 according to the second example embodiment of the disclosure together with the basic automated driving control.

The CPU 53 may repeatedly execute the intersection pre-entry control of FIG. 6 together with the basic automated driving control and the intersection restart control of FIG. 5.

In step ST21, the CPU 53 of the travel processor 32 may acquire a latest image of the region in front of the vehicle 1 captured by the camera 45 mounted on the vehicle 1 from the in-vehicle sensor processor 36. Additionally, the CPU 53 may acquire, from the in-vehicle sensor processor 36, various kinds of data regarding other vehicles, pedestrians, the intersection, presence or absence of the traffic light, and the lighting state. The various kinds of data may be results of analyzing images of the region in front of the vehicle 1 captured by the camera 45. When it is difficult to acquire these pieces of data, the CPU 53 may analyze the images by itself to acquire various kinds of data regarding other vehicles, pedestrians, and the intersection.

In step ST22, the CPU 53 of the travel processor 32 may determine whether there is an intersection in an advancing direction of the vehicle 1 traveling by the automated driving, based on the data acquired in step ST21. When there is no intersection in the advancing direction of the vehicle 1 traveling by the automated driving (step ST22: N), the CPU 53 may end the control. When there is an intersection in the advancing direction (step ST22: Y), the CPU 53 may advance the process to step ST23.

In step ST23, the CPU 53 of the travel processor 32 may acquire data on the course of the vehicle 1 at the intersection in the advancing direction of the vehicle 1. The CPU 53 may acquire the course of the vehicle 1 at the intersection, based on, for example, a path set in advance when the vehicle 1 starts traveling. The vehicle 1 may pass straight through the intersection, turn left at the intersection, or turn right at the intersection according to the path.

In step ST24, the CPU 53 of the travel processor 32 may determine whether the course of the vehicle 1 at the intersection passes straight through the intersection. If the course passes straight through the intersection (step ST24: Y), the CPU 53 may advance the process to step ST25 to execute the control to cause the vehicle 1 to pass straight through the intersection. If the course does not pass straight through the intersection (step ST24: N), the CPU 53 may end the control.

In step ST25, the CPU 53 of the travel processor 32 may determine the lighting state of the traffic light at the intersection. If the lighting state of the traffic light before entry allows the vehicle 1 to pass straight through (step ST25: Y), the CPU 53 may advance the process to step ST26. If the lighting state of the traffic light before entry does not indicate that the vehicle 1 is allowed to pass straight through (step ST25: N), the CPU 53 may advance the process to step ST29.

In step ST26, the CPU 53 of the travel processor 32 may determine the presence or absence of the preceding vehicle and the traveling state of the preceding vehicle. If there is no preceding vehicle between the intersection and the own vehicle, or if the preceding vehicle is not stopped in the intersection (step ST26: N), the CPU 53 may advance the process to step ST27. If the preceding vehicle is stopped in the intersection (step ST26: Y), the CPU 53 may advance the process to step ST29. Here, the CPU 53 may determine that the preceding vehicle is stopped in the intersection when the vehicle speed of the preceding vehicle is lower than or equal to a threshold. The term the "preceding vehicle" may refer to the preceding vehicle that is immediately in front of the own vehicle.

In step ST27, the CPU 53 of the travel processor 32 may determine whether the preceding vehicle is stopped ahead of the intersection to further determine the traveling state of the preceding vehicle. If the preceding vehicle is not stopped ahead of the intersection (step ST27: N), the CPU 53 may advance the process to step ST28. If the preceding vehicle is stopped ahead of the intersection (step ST27: Y), the CPU 53 may advance the process to step ST29.

In step ST28, the CPU 53 of the travel processor 32 may comprehensively determine whether the vehicle 1, which is the own vehicle, is able to pass straight through the intersection under the preceding vehicle following control. The determination in each of steps ST25 to ST27 may individually determine whether the vehicle 1 is able to pass straight through the intersection under the preceding vehicle following control. In step ST28, the CPU 53 may comprehensively determine whether the vehicle 1, which is the own vehicle, is able to pass straight through the intersection under the preceding vehicle following control for a factor other than the individual determinations made in steps ST25 to ST27.

For example, the CPU 53 may determine whether the remaining distance from the position of the vehicle 1, which is the own vehicle, at this point to the stop line before entering the intersection is within a predetermined distance range of, for example, less than or equal to 50 meters.

Further, the CPU 53 may determine whether a target distance is greater than or equal to the remaining distance to the stop line at the intersection. The target distance may be a distance used by the vehicle 1 to stop when the vehicle 1 decelerates in a normal manner from the current vehicle speed.

Further, the CPU 53 may determine whether the target distance is less than or equal to a distance to be traveled to finish passing through the intersection.

Further, the CPU 53 may determine whether a target vehicle speed set by the preceding vehicle following control at this point is equal to or less than a threshold.

If the vehicle 1 is able to pass straight through the intersection (step ST28: Y), the CPU 53 may advance the process to step ST32. If the vehicle 1 is not able to pass straight through the intersection (step ST28: N), the CPU 53 may advance the process to step ST29.

In step ST29, the CPU 53 of the travel processor 32 may output a forced stop instruction to the preceding vehicle following control. The CPU 53 may determine the presence or absence of the forced stop instruction in step ST12 of the preceding vehicle following control in FIG. 4. In this case, after the determination of step ST12 in FIG. 4 is made, in step ST10, the CPU 53 may execute the travel control that decelerates and stops the vehicle 1 in order to stop the vehicle 1 before entering the intersection. This makes it possible for the vehicle 1 to stop before entering the intersection.

In the process of this step, the CPU 53 may generate various kinds of data used to execute the travel control that decelerates and stops the vehicle 1 in the preceding vehicle following control of FIG. 4. The data may include, for example, data on the remaining distance from the position of the vehicle 1, which is the own vehicle, at this point to the stop line before the vehicle 1 enters the intersection. The CPU 53 may output the generated data to the preceding vehicle following control together with a deceleration and stop instruction. In this case, in step ST10 of FIG. 4, it is possible for the CPU 53 to execute the travel control that decelerates and stops the vehicle 1 in order to stop the vehicle 1 within the remaining distance to the stop line.

Here, the position of the vehicle 1 at this point may be the position generated by the GNSS receiver 47, but may be a position that is forward of the driver of the vehicle 1. As a result, it is possible for the vehicle 1 to stop with respect to the stop line in a state close to a case where the driver intends to stop at the stop line.

The remaining distance may include data on an offset distance. As a result, in step ST10 of FIG. 4, when there is a possibility of sudden deceleration in order to stop within the remaining distance to the stop line, it is possible for the CPU 53 to execute a deceleration and stop control to stop the vehicle 1 by a distance obtained by adding the offset distance to the remaining distance while reducing the deceleration rate. In this case, the vehicle 1 may possibly enter the intersection and stop. However, reducing the sudden deceleration makes it less likely that the driver who drives the vehicle 1 and a driver who drives a subsequent vehicle feel uncomfortable about an intersection stop control of the automated driving.

In step ST30, the CPU 53 of the travel processor 32 may acquire the vehicle speed of the vehicle 1 from the in-vehicle sensor processor 36 and determine whether the vehicle 1 has stopped. If the vehicle 1 has not stopped (step ST30: N), the CPU 53 may return the process to step ST29 and continue outputting the forced stop instruction. In this case, the deceleration and stop control that stops the vehicle 1 may be continued. When the vehicle 1 has stopped (step ST30: Y), the CPU 53 may advance the process to step ST31.

In step ST31, the CPU 53 of the travel processor 32 may suspend the preceding vehicle following control. As a result, the CPU 53 may temporarily refrain from executing the preceding vehicle following control of FIG. 4. The stopped vehicle 1 may refrain from restarting traveling under the preceding vehicle following control. It is possible for the stopped vehicle 1 to maintain a stopped state even when there is a space between the preceding vehicle and the vehicle 1.

Note that the CPU 53 may also suspend the basic automated driving control other than the preceding vehicle following control.

Thereafter, the CPU 53 may end the control.

Thus, before the vehicle 1 traveling under the preceding vehicle following control enters the intersection having the traffic light, the CPU 53 of the travel processor 32 may determine whether the vehicle 1 traveling under the preceding vehicle following control is able to pass through the intersection. If it is determined that the vehicle 1 is not able to pass through the intersection under the preceding vehicle following control, the CPU 53 may execute, by the preceding vehicle following control, a travel control that stops the vehicle 1 aiming at the stop position of the intersection. Furthermore, when the vehicle 1 is stopped, the CPU 53 may suspend the preceding vehicle following control.

The preceding vehicle may possibly stop in the intersection when, for example, there is a traffic jam ahead of the intersection. When the preceding vehicle enters the intersection and stops in the intersection, the vehicle 1 that is adapted to travel by the automated driving under the preceding vehicle following control may possibly enter the intersection subsequent to the preceding vehicle and stop in the intersection. If the lighting state of the traffic light is changed thereafter, the vehicle 1 stopped in the intersection may possibly obstruct traveling of the fourth vehicle 8 that is allowed to pass through the intersection in the lighting state of the traffic light that has changed. For example, at the intersection where the traffic light is provided, the vehicle 1 is to refrain from keeping stopped in the intersection taking into consideration that some countries prohibit a vehicle from keeping stopped in an intersection by, for example, law.

In some embodiments, when the vehicle 1 is to pass straight through the intersection under the preceding vehicle following control and the preceding vehicle in front of the vehicle 1 is stopped in or ahead of the intersection, the CPU 53 may determine that the vehicle 1 is not able to pass through the intersection under the preceding vehicle following control even if the traffic light at the intersection is in the lighting state indicating that the vehicle 1 is allowed to pass straight through. It is possible for the CPU 53 to execute, by the preceding vehicle following control, the travel control to stop the vehicle 1 aiming at the stop position of the intersection. Thus, when the vehicle 1 is to pass straight through the intersection, the vehicle 1 is less likely to enter the intersection subsequent to the preceding vehicle and stop in the intersection.

When the CPU 53 of the travel processor 32 determines, in step ST28, that the vehicle 1, which is the own vehicle, is able to pass straight through the intersection under the preceding vehicle following control (step ST28: Y), the CPU 53 may advance the process to step ST32.

In this case, the CPU 53 may determine at least that the lighting state of the traffic light allows the vehicle 1 to pass straight through in step ST25, and that the preceding vehicle is not stopped in and ahead of the intersection in steps ST26 and ST27.

In step ST32, the CPU 53 of the travel processor 32 may determine whether the preceding vehicle following control is suspended by the process of step ST32. If the preceding vehicle following control is not being suspended (step ST32: N), the CPU 53 may end the control. If the preceding vehicle following control is being suspended (step ST32: Y), the CPU 53 may advance the process to step ST33.

In step ST33, the CPU 53 of the travel processor 32 may restart the preceding vehicle following control that has been suspended. Thus, the CPU 53 may restart the preceding vehicle following control of FIG. 4. It is possible for the vehicle 1 that has been stopped to restart traveling under the preceding vehicle following control. The vehicle 1 may start traveling to follow the preceding vehicle.

Note that, if the basic automated driving control other than the preceding vehicle following control is also suspended, the CPU 53 may restart the suspended control in a similar manner.

Thereafter, the CPU 53 may end the control.

In some embodiments, when the vehicle 1 is to pass straight through the intersection under the preceding vehicle following control and the preceding vehicle in front of the vehicle 1 is stopped in or ahead of the intersection, it is possible for the CPU 53 of the travel processor 32 to cause the preceding vehicle following control to execute the forced stop control that stops the vehicle 1 aiming at the stop position of the intersection even if the traffic light at the intersection is in the lighting state indicating that the vehicle 1 is allowed to pass straight through.

Further, it is possible for the CPU 53 of the travel processor 32 to suspend the preceding vehicle following control when the vehicle 1 is stopped by the forced stop control, and restart the preceding vehicle following control when the preceding vehicle is no longer stopped in or ahead of the intersection.

As described above, in some embodiments, when the vehicle 1 is to pass straight through the intersection under the preceding vehicle following control and the preceding vehicle in front of the vehicle 1 is stopped in or ahead of the intersection, it is possible for the CPU 53 of the travel processor 32 to cause the preceding vehicle following control to stop the vehicle 1 aiming at the stop position of the intersection even if the traffic light at the intersection is in the lighting state indicating that the vehicle 1 is allowed to pass straight through.

As a result, when the vehicle 1 is to pass straight through the intersection and the preceding vehicle is stopped in or ahead of the intersection, it is possible to help prevent the vehicle 1 from entering the intersection.

In some embodiments, the CPU 53 of the travel processor 32 may suspend the preceding vehicle following control when the vehicle 1 is stopped by the forced stop control, and restart the preceding vehicle following control when the preceding vehicle is no longer stopped in or ahead of the intersection. This helps to prevent the vehicle 1 from executing the preceding vehicle following control during a period in which the preceding vehicle is stopped in or ahead of the intersection.

In contrast, if the CPU 53 of the travel processor 32 continues executing the preceding vehicle following control even after the vehicle 1 is stopped aiming at the stop position of the intersection, there is a possibility that the vehicle 1 starts moving based on the fact that the lighting state of the traffic light has thereafter returned to the lighting state indicating that the vehicle 1 is allowed to pass straight through. If the preceding vehicle continues to stop in or ahead of the intersection even when the traffic light has changed, the vehicle 1 may possibly stop in the intersection. Thereafter, if the lighting state of the traffic light further changes from the lighting state indicating that the vehicle 1 is allowed to pass straight through, the vehicle 1 that is stopped in the intersection may possibly obstruct the passage through the intersection of the fourth vehicle 8 or the pedestrian 15 that is allowed to go after the lighting state of the traffic light at the intersection has changed. In some embodiments, such a situation is unlikely to occur.

As described above, the example embodiment helps to improve the traveling of the vehicle 1 under the control of the vehicle travel control apparatus.

Third Example Embodiment

In the following, a description is given of a third example embodiment of the disclosure. In the third example embodiment, the control of the above-described example embodiments may be executed by the server apparatus 101 instead of the control system 30 of the vehicle 1 that is adapted to travel under the automated driving control. The server apparatus 101 communicates with the vehicle 1 and controls the traveling of the vehicle 1 by remote control or traffic control. In the third example embodiment, the same reference numerals are used for components similar to those in the above-described example embodiments, and illustration and description thereof are omitted. Differences from the above-described example embodiments will be mainly described.

Figure 7:
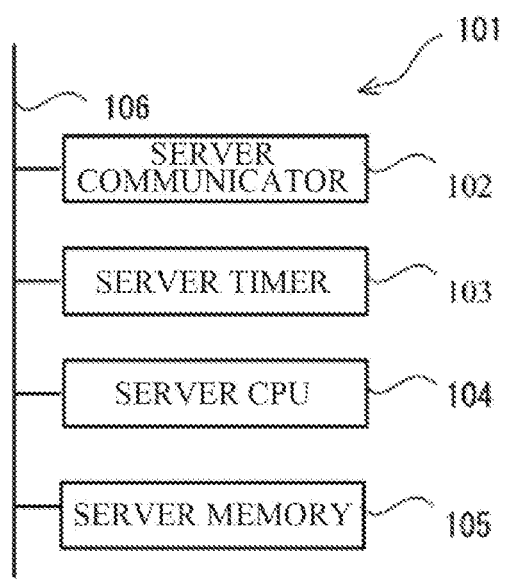
FIG. 7 is a configuration diagram illustrating a basic configuration of a server apparatus according to one example embodiment of the disclosure, the server apparatus being communicable with a vehicle that is adapted to travel by the automated driving.

FIG. 7 is a configuration diagram illustrating a basic configuration of the server apparatus 101 according to the third example embodiment of the disclosure. The server apparatus 101 communicates with the vehicle 1 that is adapted to travel by the automated driving.

The server apparatus 101 of FIG. 7 may include a server communicator 102, a server timer 103, a server memory 105, a server central processing unit (CPU) 104, and a server bus 106 to which these components are coupled.

The server communicator 102 may be coupled to a communication network such as the Internet. As illustrated in FIG. 2, the server communicator 102 may transmit and receive data to and from the external communicator 37 of the vehicle 1 traveling on the road through, for example, the base station 100 coupled to the communication network. In one embodiment, the server communicator 102 may serve as a "server communicator".

The server timer 103 may measure a time or a time period.

The server memory 105 may store programs to be executed by the server CPU 104 and data. The server memory 105 may include, for example, a non-volatile semiconductor memory, a hard disk drive (HDD), and a random access memory (RAM).

The server CPU 104 may read and execute the programs stored in the server memory 105. This may implement a server processor in the server apparatus 101. The server CPU 104 may manage the operation of the server apparatus 101. The server CPU 104 may operate as the automated driving processor for the vehicle 1, which remotely controls or assists the traveling of the vehicle 1. In this case, the server CPU 104 may use the server communicator 102 to acquire various kinds of data from the vehicle 1, and transmit, to the vehicle 1, data that is usable by the CPU 53 of the control system 30 of the vehicle 1 for the travel control of the own vehicle.

The server CPU 104 operating as the vehicle travel control apparatus may execute one or both of the intersection restart control of FIG. 5 and the intersection pre-entry control of FIG. 6 using the data acquired from the vehicle 1 to remotely control or manage the traveling of the vehicle 1.

In this case, the travel processor 32 of the control system 30 of the vehicle 1 may execute controls that are not executed by the server CPU 104 together with the basic automated driving control such as the preceding vehicle following control of FIG. 4. When there is the forced stop instruction or a forced execution instruction from the server apparatus 101, the travel processor 32 of the control system 30 of the vehicle 1 may execute processing similar to that in the above-described example embodiments, based on the instructions.

Note that the server CPU 104 of the server apparatus 101 and the CPU 53 of the control system 30 of the vehicle 1 may execute controls shared differently from those described above. In any case, the server CPU 104 of the server apparatus 101 and the CPU 53 of the control system 30 of the vehicle 1 may cooperate with each other to execute various controls of the above-described example embodiments.

As described above, the server apparatus 101 of the third example embodiment communicates, through the server communicator 102, with the vehicle 1 that is adapted to travel on the road including the intersection having the traffic light under the automated driving control including the preceding vehicle following control. The server CPU 104 of the server apparatus 101 is configured to execute the travel control of the vehicle 1, based on the image taken by the camera 45 that is mounted on the vehicle 1 and captures the image of the course of the vehicle 1. In one embodiment, the server CPU 104 may serve as a "server processor".

For example, when the traffic light at the intersection is changed from the lighting state indicating that the vehicle 1 is allowed to pass along the course of the vehicle 1 after the vehicle 1 is stopped at the intersection having the traffic light, the server CPU 104 is configured to determine whether the vehicle 1 is allowable to start moving under the automated driving control, based on the projection amount of the current position of the vehicle 1 stopped at the intersection from the stop position of the intersection. When the projection amount is greater than or equal to the threshold, the server CPU 104 is configured to forcibly execute the preceding vehicle following control to restart the vehicle 1 stopped at the intersection to allow the vehicle 1 to escape from the intersection.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In at least one embodiment of the disclosure, the vehicle is adapted to travel on the road including the intersection having the traffic light under the automated driving control including the preceding vehicle following control. Further, when the traffic light at the intersection is changed from the lighting state indicating that the vehicle is allowed to pass along the course of the vehicle after the vehicle is stopped at the intersection having the traffic light, the automated driving processor determines whether the vehicle is allowable to start moving under the automated driving control, based on the projection amount of the current position of the vehicle stopped at the intersection from the stop position of the intersection. When the projection amount is greater than or equal to the threshold, the automated driving processor forcibly executes the preceding vehicle following control to restart the vehicle stopped at the intersection to allow the vehicle to escape from the intersection.

This helps to prevent the vehicle from continuing to stop at the intersection after the traffic light of the intersection has changed from the lighting state indicating that the vehicle is allowed to pass along the course of the vehicle. This helps to prevent the vehicle from obstructing the passage, through the intersection, of other vehicles or pedestrians that are permitted to go after the lighting state of the traffic light at the intersection has changed.

The vehicle travel control apparatus according to at least one embodiment of the disclosure makes it possible to improve the traveling of the vehicle under the control.

Each of the CPU 53 illustrated in FIG. 3 and the server CPU 104 illustrated in FIG. 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the CPU 53 and the server CPU 104. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the CPU 53 illustrated in FIG. 3 and the server CPU 104 illustrated in FIG. 7.

The invention claimed is:

1. A vehicle travel control apparatus to be applied to a vehicle, the vehicle travel control apparatus comprising:
  a camera configured to capture an image of a course of the vehicle; and
  an automated driving processor configured to execute, based on the image captured by the camera, an automated driving control for causing the vehicle to travel on a road including an intersection having a traffic light, the automated driving control including a preceding-vehicle following control,
  wherein the automated driving processor is configured to:
    determine whether the vehicle has stopped in the intersection;
    in response to determining that the vehicle has stopped in the intersection, determine whether the traffic light at the intersection is changed from a lighting state indicating that the vehicle is allowed to pass along the course of the vehicle;
    acquire, based on position data from the vehicle, a current position of the vehicle;
    acquire, as a stop position at the intersection at which the vehicle is to stop, a position of the stop line provided for the intersection;
    calculate, as a projection amount, an amount by which the current position of the vehicle is advanced from the stop position of the intersection along the course of the vehicle;
    determine whether the projection amount is greater than or equal to a threshold; and
    in response to determining that the projection amount is greater than or equal to a threshold, forcibly execute the preceding vehicle following control to restart the vehicle stopped at the intersection and allow the vehicle to escape from the intersection.

2. The vehicle travel control apparatus according to claim 1, wherein the automated driving processor is configured to cause the vehicle to at least travel following a preceding vehicle traveling in front of the vehicle under the preceding vehicle following control.

3. The vehicle travel control apparatus according to claim 1, wherein the automated driving processor is configured to, when the vehicle is to pass straight through the intersection under the preceding vehicle following control and a preceding vehicle in front of the vehicle is stopped at or ahead of the intersection, cause the preceding vehicle following control to execute a forced stop control to stop the vehicle aiming at the stop position at the intersection, even if the traffic light at the intersection is in a lighting state indicating that the vehicle is allowed to pass straight through.

4. The vehicle travel control apparatus according to claim 2, wherein the automated driving processor is configured to, when the vehicle is to pass straight through the intersection under the preceding vehicle following control and a preceding vehicle in front of the vehicle is stopped at or ahead of the intersection, cause the preceding vehicle following control to execute a forced stop control to stop the vehicle aiming at the stop position at the intersection, even if the traffic light at the intersection is in a lighting state indicating that the vehicle is allowed to pass straight through.

5. The vehicle travel control apparatus according to claim 3, wherein the automated driving processor is configured to suspend the preceding vehicle following control when the vehicle is stopped by the forced stop control, and restart the preceding vehicle following control when the preceding vehicle is no longer stopped at or ahead of the intersection.

6. The vehicle travel control apparatus according to claim 4, wherein the automated driving processor is configured to suspend the preceding vehicle following control when the vehicle is stopped by the forced stop control, and restart the preceding vehicle following control when the preceding vehicle is no longer stopped at or ahead of the intersection.

7. The vehicle travel control apparatus according to claim 5, wherein the automated driving processor is configured to use, in calculating the projection amount, a position forward of a driver who drives the vehicle as the current position of the vehicle to be compared with the stop position of the intersection.

8. The vehicle travel control apparatus according to claim 6, wherein the automated driving processor is configured to use, in calculating the projection amount, a position forward of a driver who drives the vehicle as the current position of the vehicle to be compared with the stop position of the intersection.

9. A server apparatus comprising:
- a server communicator configured to communicate with a vehicle that is adapted to travel on a road comprising an intersection having a traffic light under an automated driving control including a preceding vehicle following control; and
- a server processor configured to execute, based on an image taken by a camera that is mounted on the vehicle and is configured to capture the image of a course of the vehicle, the automated driving control for causing the vehicle, wherein the server processor is configured to:
- determine whether the vehicle has stopped in the intersection;
- in response to determining that the vehicle has stopped in the intersection, determine whether the traffic light at the intersection is changed from a lighting state indicating that the vehicle is allowed to pass along the course of the vehicle;
- acquire, based on position data from the vehicle, a current position of the vehicle;
- acquire, as a stop position at the intersection at which the vehicle is to stop, a position of the stop line provided for the intersection;
- calculate, as a projection amount, an amount by which the current position of the vehicle is advanced from the stop position of the intersection along the course of the vehicle;
- determine whether the projection amount is greater than or equal to a threshold; and
- in response to determining that the projection amount is greater than or equal to a threshold, forcibly execute the preceding vehicle following control to restart the vehicle stopped at the intersection and allow the vehicle to escape from the intersection.

\* \* \* \* \*